June 23, 1931. A. T. MALTBY 1,811,181
PROCESS AND APPARATUS FOR TREATING SEWAGE OR OTHER ORGANIC MATTERS
Filed Oct. 20, 1928
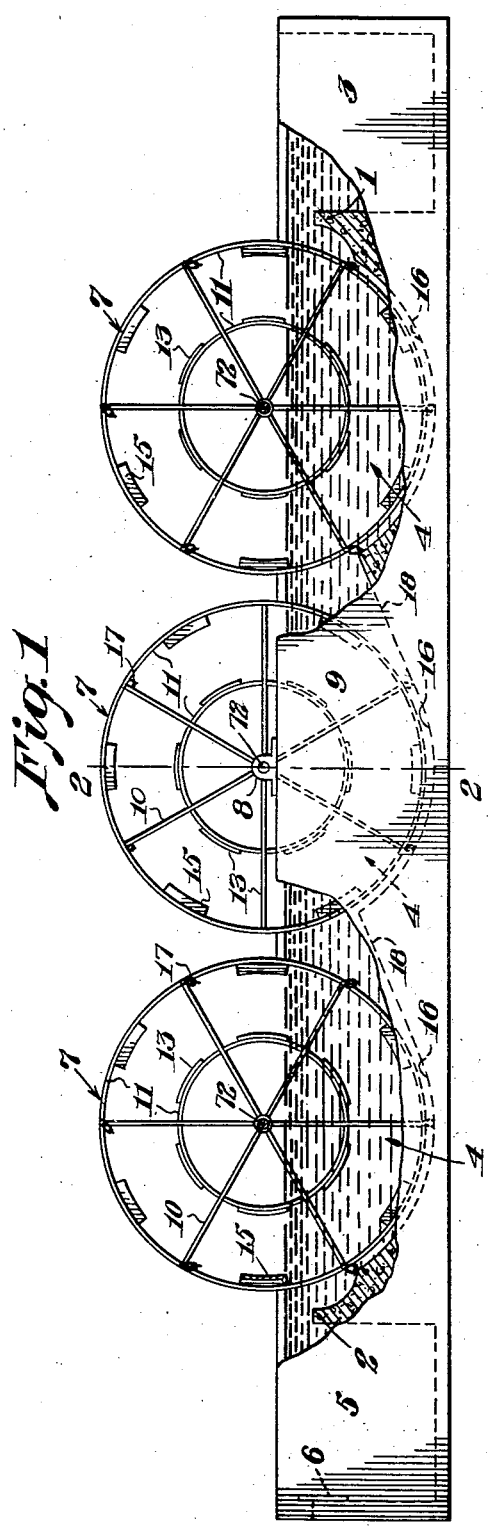
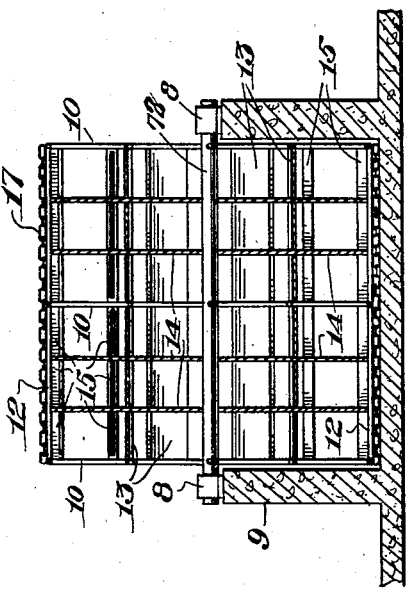
Inventor:
Arthur T Maltby Patented June 23, 1931

1,811,181

UNITED STATES PATENT OFFICE

ARTHUR T. MALTBY, OF CHICAGO, ILLINOIS

PROCESS AND APPARATUS FOR TREATING SEWAGE OR OTHER ORGANIC MATTERS

Application filed October 20, 1928. Serial No. 313,845.

My invention relates to improvements in the biologic process for the treatment of sewage, or other water borne organic matters, in which superficial areas supporting bacterial growths, called "contact beds", are brought in contact alternately with the treated liquor and the atmosphere, the liquor being subjected to the activities of the bacterial growths for the purpose of disintegrating, nitrifying, and mineralizing the organic content therein, while at the same time preventing, so far as practical, any putrifactive tendency of the organic content of said liquor both during and after treatment.

The organic content of a contaminated liquid usually occurs in two characteristic physical conditions, namely: the insoluble and undissolved, chiefly carbon, elements, which are carried in suspension, and the soluble liquefied, chiefly nitrogen, elements carried in solution.

The disintegration of dead organic matter by bacteria is carried on in two progressive stages namely: carbon and nitrogen fermentations, each of which may be subdivided into first and second carbon and first and second nitrogen fermentations respectively.

There are two general types of bacteria which effect the disintegration of organic matter, namely: the anaerobic type, which thrive and operate in the absence of air, and the aerobic type, which thrive and operate in the presence of air.

Anaerobic fermentations are productive of putrifaction, offensive odors, and unsightly conditions, and are effective in the initial, or first carbon fermentations only, the latter three necessarily being aerobic.

Aerobic fermentations do not cause putrifaction or offensive odors, and are therefore preferable, but none of them will function while subject to the effects of anaerobic activities, and also the latter three, which are harmonious, will not take place while the initial or rectifying aerobic fermentation is in progress, unless segregated.

When the velocity of flow of the liquid is retarded, or becomes quiescent, more or less of the unfermented suspended matters will settle out and accumulate wherever lodgment is found, thereby setting up anaerobic fermentation to the detriment of aerobic functions.

The fundamental necessity of aerobic fermentation is to subject the organic matter to the action of bacteria in the intimate presence of oxygen and moisture at one and the same time. The oxygen may be as dissolved air in the liquid, to be renewed by periodic exposure to the atmosphere, or air and capillary moisture, as in the soil between rain storms in nature.

The effect of aerobic first carbon fermentation is to release various gas and liquid elements, leaving a black, sticky, residue called "humus" which has the faculty of adhering to metallic and other substances. Under more or less confined conditions as in a filter, the various suspended, floating and colloidal matters, undergoing initial fermentation, will prevent aerobic functions, and will accumulate and clog the openings, excluding air, with consequent putrifactive effect. It is therefore necessary to remove the suspended matters before applying the liquid to a filter.

Humus is however, the natural and seemingly necessary environment for aerobic bacterial life, and under proper conditions of distribution, drainage, and aeration, will undergo secondary fermentation, the greatly reduced final residue becoming nonputrescible.

A general object of the present invention, is to produce an improved process for treating sewage or other liquid organic matters, which operates exclusively through activity of bacterial growths of the aerobic type.

A further object is to provide apparatus arranged to carry out and accelerate both the carbon and nitrogen fermentations of liquid borne organic matters, in one progressively continuous operation by means of aerobic bacterial growths.

A further object is to provide apparatus arranged to thoroughly distribute and thereby bring about intimate contact between the organic matters and the bacterial growths, in the presence of air and moisture, and at the same time prevent lodgement or accumulation of unfermented organic matters to the extent of causing anaerobic fermentations and consequent interference with normal aerobic functions.

A still further object is to provide openly exposed areas of such arrangement and extent, as will retain and carry the normal deposits of humus and aerobic bacterial growths, without congestion, and provide for aerating the same during intermittent periods.

A further characteristic of the invention, resides in a mechanism and process of the character referred to, which operates on the "fill and draw" principle, as well as the continuous flow method.

These objects I accomplish by the use of a "biologic" wheel having a central axle arranged to revolve in bearings mounted upon opposite side walls of a conduit or pit, into which the lower part of the wheel projects: by the use of transverse plates and discs located in the body of the wheel, said plates and discs designed to provide surface area to which humus and the necessary bacterial growths may adhere and form contact beds, and the plates and discs so arranged that the wheel may be caused to revolve by force of the flowing liquor through the conduit, or be driven by other sources of power as desired; by the use of a plurality of wheels arranged in series in a conduit the liquor flowing by gravity through one wheel to another until the required retention period of treatment is obtained; and by the use of a tank with one or more wheels which are caused to revolve by extraneous power until the required retention period of treatment is obtained.

These and other objects and features of the invention will appear more fully from the following detailed description when read in connection with the accompanying drawings, and will be pointed out in the appended claims.

The invention is illustrated by the accompanying drawings in which Fig. 1 is a side elevation with portions of the side wall of the tank and wheel pits removed showing arrangement and position of the wheels in relation to the tanks, the liquor, and to one another. Fig. 2 is a cross section of the wheel pit and wheel on the line 2—2.

In the drawings, the numerals indicate the various parts throughout the various views.

A rectangular tank, constructed of concrete or other suitable material, is divided by the weirs (1) and (2) into three compartments, viz, the precipitation, or grit, chamber, in which the heavy and inorganic substances are separated from the incoming liquor, the digestion chamber (4) in which the liquor is subjected to the action of the bacterial growths carried by the contact beds, and the sedimentation tank (5) in which the residual sludge is allowed to settle out of the treated liquor, the effluent passing over the adjustable weir (6), which regulates the rate of flow through the series of chambers.

One or more biologic wheels (7) is associated with the digestion chamber (4). The wheels are so positioned in respect to the digestion chamber and the level of the liquid therein, that substantially the lower half of the wheel will be submerged in the liquid, and the other half will be exposed to the atmosphere.

The central axle (72) of each wheel extends transversely across the top of the digestion chamber and is supported at each end by the bearings (8) mounted on top of the opposite side walls (9) of said chamber. The spokes (10), stiffening rings (11) and transverse bars (12) form a circular skeleton frame upon which the plates or diaphragms (13) and the discs (14) are carried. A plurality of transverse dipper plates (15) are located transversely across the periphery of the wheel, the open side in the direction of flow. The plates and discs serve to accumulate bacterial growths thereby forming contact beds.

Each wheel (7) is mounted above a wheel pit (16) the surface of which is circular to conform to the curvature of the wheel periphery and this curved arc is wiped by the drag chains (17) located upon the periphery of the wheel. From the top of the down stream end of the said curved sector, the tank bottom (18) slants down to the succeeding wheel pit thus preventing accumulations of sludge.

It will be seen that the basic principle of this improvement is the employment of movable contact beds and removing the beds from the liquor (instead of removing the liquor from the bed) for aerating and rejuvenating purposes, thus facilitating the use of the "continuous flow" principle.

It will also be seen that as the bacterial growths accumulate, the entire exposed surface of the wheel will become activated therewith.

It will also be seen that the transverse plates by obstructing the passage of the flowing liquor through the wheel pit will cause the wheel to revolve thereby causing the activated contact beds to be alternately immersed in the liquor and aerated in the atmosphere.

The transverse plates divide the wheel into segments which become filled with the liquid during the rotation of the wheel. The liquid entrapped within each segment is reversed during its passage through the wheel, that is to say, the plate constituting the bottom of the segment on the inlet side, becomes the top of the segment on the outlet side of the wheel thereby exposing the lower strata of the liquid to the atmosphere. The wheel rotates at the same velocity as the flowing liquid thereby producing a condition of relative quiescence between the liquid and the moving plates during the submerged period. However in spite of the fact that the liquid is not agitated, or rather in view of that fact, the liquid and its contained matter will be brought into intimate contact with the bacterial growths and air by reason of being distributed broadly across the transverse plates on the wheel and thus subjected to, and inoculated with, the bacterial growths thereon. Consecutive aerobic fermentations are brought about in this manner.

It will also be seen that as the sludge settles out of the liquor in each segment, during its passage through the wheel, it will generally fall upon one of the activated contact beds and be subjected thereto during the submerged and aerating period, and that such portion of the sludge as may fall from, or between the beds will reach the curved sector of the wheel pit and be carried along, or be broken up by the wiping chains on the wheel periphery.

It will also be seen that the dippers will carry a volume of air to the bottom of the wheel pit where it is automatically released to float upward to further aerate the liquid entrapped within a submerged segment.

It will also be seen that the circular discs divide the segments into longitudinal slots thereby providing additional surface area for accumulating baterial growths and also serve to largely replace the transverse plates when the wheel is driven by power other than the flowing liquid.

What I claim is:

1. Apparatus for treating sewage or other liquid organic matters including a rotor provided with a plurality of radially disposed transverse plates carrying bacterial growths, and a container for the liquid the lower portion of the container formed as a circular transverse pit the curved surface of which is arranged to receive and closely conform to the curve of the wheel periphery and the wheel positioned and caused to rotate in said container with the lower portion of the wheel periphery moving in close relation to the curved surface of the pit and in such manner that the bacterial growths are periodically submerged in the liquid and exposed to the atmosphere.

2. Apparatus for treating sewage or other liquid organic matters, including a rotor provided with a plurality of transverse and circular plates carrying bacterial growths and a container for the liquid the lower part of the container formed as a circular transverse pit having a curved section arranged to receive and closely conform to the curve of the rotor periphery and the rotor positioned and caused to rotate in the container in such manner and relation that the bacterial growths carried in said rotor are periodically submerged in the liquid in said pit and exposed to the atmosphere.

3. A rotary biologic wheel provided with radially disposed transverse plates carrying bacterial growths and a container holding a liquid the lower portion of the container formed as a transverse pit having a curved section arranged to conform to the curve of the wheel periphery and the wheel positioned and caused to rotate in said container with the lower portion of the wheel periphery moving in close relation to the curved surface of said pit in such manner that the lower portion of the wheel is submerged in the liquid in said pit and the upper portion exposed to the atmosphere.

4. Apparatus for treating sewage or other liquid organic matters including a series of biologic wheels divided into segments by radially disposed transverse plates which serve to carry bacterial growths and a tank through which the liquid flows the lower portion of the tank formed as a series of transverse circular pits the curved surfaces of which are arranged to receive and closely conform to the curve of the wheel peripheries and the wheels positioned and caused to rotate in said tank with the lower part of the wheel peripheries moving in close relation to the curved surfaces of the pits and in such manner that the bacterial growths are alternately submerged in the liquid in said pits and exposed to the atmosphere.

5. Apparatus for purifying sewage or other liquid organic matters by means of aerobic bacterial fermentations said apparatus including a rotary biologic wheel provided with transverse plates carrying bacterial growths and a container for the liquid the lower portion of the container formed as a transverse circular pit arranged to receive and closely conform to the periphery curve of the wheel and the wheel positioned and caused to rotate in such manner that the lower part of the wheel periphery will move in close relation to the curved surface of the pit thereby preventing the accumulation of organic sediment therein the rotation of the wheel causing the bacterial growths to be alternately submerged in the liquid and aerated in the atmosphere.

6. Apparatus for treating sewage or other liquid organic matters including a rotary biologic wheel provided with radially disposed transverse plates carrying bacterial growths and a container through which the liquid flows, the lower part of the container formed as a transverse circular pit arranged to receive and closely conform to the curve of the wheel periphery and the wheel positioned and caused to rotate with the lower part of the wheel periphery in close relation to the curved surface in said pit and in such manner that said transverse plates are caused to move at the same average velocity as the flow of the liquid through the pit thereby maintaining a condition of quiescence relative to the liquid and the moving bacterial growths carried on said plates.

7. Apparatus for purifying sewage or other liquid organic matters including a rotor provided with transverse plates carrying bacterial growths and a container through which the liquid flows the lower part of the container formed as a transverse circular pit arranged to receive and closely conform to the periphery curve of the rotor and the rotor positioned and caused to rotate in the container in such manner that the lower part of the rotor periphery will move in close relation to the curved surface of the pit the rotation of the rotor causing the bacterial growths to be alternately submerged in the liquid and exposed to the atmosphere whereby the incoming liquid is continuously inoculated with aerobic bacterial growths derived from said bacterial growths carried in the rotor.

8. Apparatus for purifying sewage or other liquid organic matters including a rotary biologic wheel divided into transverse segments by radially disposed transverse plates and the segments also divided longitudinally by circularly disposed plates the said plates carrying bacterial growths and a container for the liquid the lower portion of the container formed as a transverse circular pit conforming to the curve of the wheel periphery and the wheel positioned and caused to rotate in the container in such manner and relation that the bacterial growths on said plates are alternately submerged in the liquid in said pit and exposed to the atmosphere.

9. Apparatus for treating sewage or other liquid organic matters including a rotary biologic wheel divided into segments by radially disposed transverse plates carrying bacterial growths and a container through which the liquid flows the lower portion of the container formed as a transverse circular pit arranged to receive and closely conform to the wheel periphery and the wheel positioned with the axle above the liquid level in the container and the lower part of the wheel periphery in close relation to the curved surface of the pit in such manner that the plates obstruct the flow of the liquid causing said liquid to pass through the submerged segment divisions of the wheel and be spread broadly across the transverse faces of said plates as the wheel revolves thereby exposing the liquid and the organic content therein to the bacterial growths carried on said plates.

10. Apparatus for treating sewage or other liquid organic matters including a mechanism provided with spaced apart transverse plates arranged and caused to move with their faces forming openly exposed surface areas for supporting bacterial growths and a container for the liquid the bottom of the container so arranged that the lower edge of the aforesaid transverse plates will move in close relation thereto in such manner that unfermented organic sediment accumulations are prevented and the bacterial growths are periodically submerged in the liquid in the container and exposed to the atmosphere.

ARTHUR T. MALTBY.